No. 818,562. PATENTED APR. 24, 1906.
T. M. ROSS.
DISK JOINTER.
APPLICATION FILED JAN. 22, 1906.
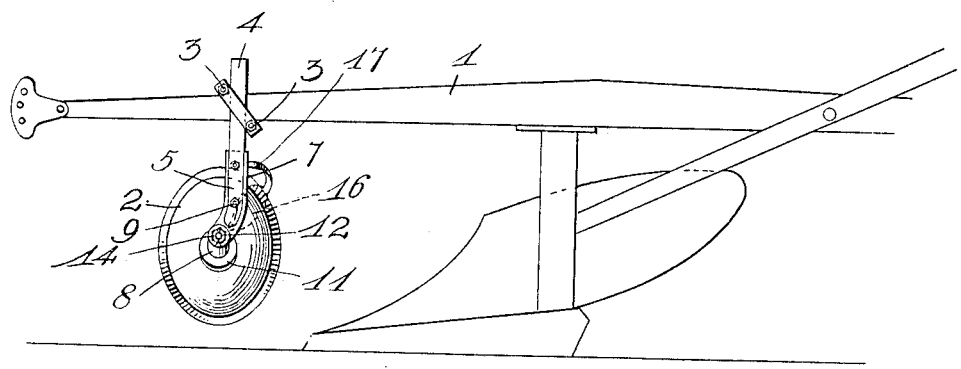
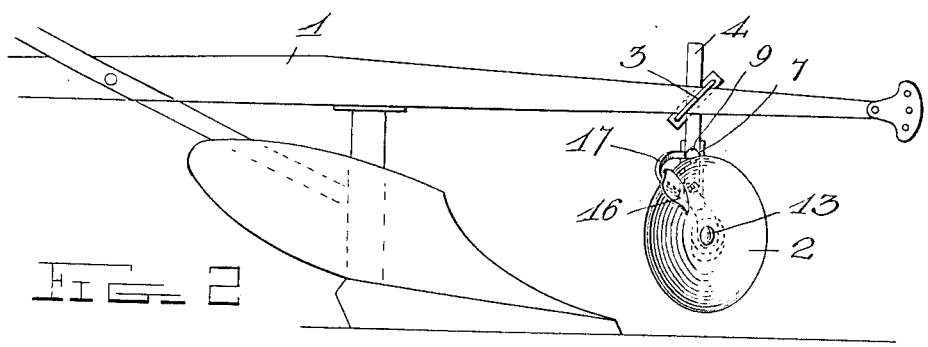
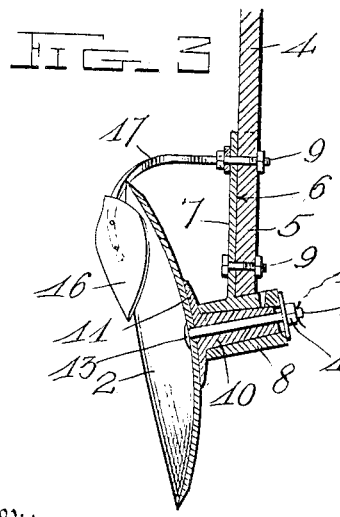 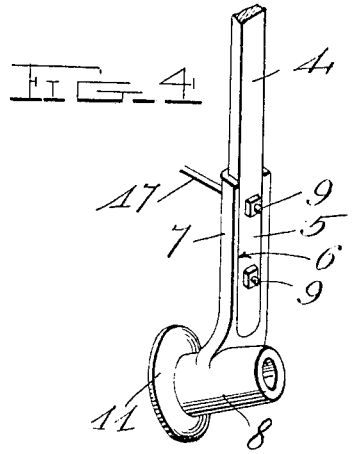
Witnesses
C. Clement
C. H. Griesbauer.
Inventor
T. M. Ross
by H. B. Willson
Attorney

UNITED STATES PATENT OFFICE.

THOMAS MACK ROSS, OF CARTHAGE, MISSOURI.

DISK JOINTER.

No. 818,562.  Specification of Letters Patent.  Patented April 24, 1906.

Application filed January 22, 1906. Serial No. 297,285.

*To all whom it may concern:*

Be it known that I, THOMAS MACK ROSS, a citizen of the United States, residing at Carthage, in the county of Jasper and State of Missouri, have invented certain new and useful Improvements in Disk Jointers; and I do declare the following to be a full, clear, and exact description of the invention, such as will enable others skilled in the art to which it appertains to make and use the same.

My invention relates to improvements in disk jointers for plows; and it consists in the novel construction, combination, and arrangement of parts hereinafter described and claimed.

The object of the invention is to provide a simple, durable, efficient, and comparatively inexpensive device of this character which will simultaneously perform the work of the common jointer and the rolling cutter.

The above and other objects, which will appear as the nature of the invention is better understood, are accomplished by means of the construction illustrated in the accompanying drawings, in which—

Figure 1 is a view of my improved disk jointer, showing the front face of the same. Fig. 2 is a similar view of the rear face. Fig. 3 is a detail sectional view, and Fig. 4 is a detail view of the bearing.

Referring to the drawings by numerals, 1 denotes a plow-beam, upon which my improved disk jointer 2 is adjustably clamped. This is accomplished by means of the usual U-shaped clamping-bolt 3, which secures a hanger or bracket-arm 4 upon one side of the beam 1. The hanger or bracket 4 has its lower end 5 fitted into a seat 6, which is formed in an arm 7 upon a bearing 8. The end 5 of the bracket is retained in the seat 6 of the arm by bolts or other suitable fastening means 9, as shown. The bearing 8 is conical in form and is disposed angularly with respect to the arm 7, so that the disk jointer 2 will have the proper inclination. The jointer 2 is in the form of a disk which has secured upon its rear or convex face a conical journal 10, which is adapted to rotate in the bearing 8. Said journal is in the form of a circular plate 11, which has its outer face dished or shaped to fit the convex face of the jointer 2. The latter is secured to said plate, and the journal 10 is retained in the bearing 8 by means of a bolt 12, which is passed through alining openings formed in the jointer and in the journal 10, as clearly shown in Fig. 3 of the drawings. The head of the bolt 13 engages the inner or concave face of the jointer, and the screw-threaded end of said bolt is adapted to receive a washer and a nut 14. The latter is prevented from turning off of the bolt by a split key 15, which is inserted in a transverse opening in the end of the bolt, as shown. The disk jointer is kept clean by a scraper 16, secured upon an arm or bracket 17, which has its upper end secured to the arm 7 by one of the bolts 9, as clearly shown in the drawings.

The construction, operation, and advantages of the invention will be readily understood from the foregoing description, taken in connection with the accompanying drawings. It will be seen that this disk jointer will cut all vines, roots, weeds, and the like and turn the soil over in an easier manner than the common jointer, because the rolling of the disk will cut the soil instead of breaking it. When a left-hand disk jointer is desired, the bearing 8 here shown must be replaced by one which has its arm projecting in the proper angular direction.

Various changes in the form, proportion, and the minor details of construction may be resorted to without departing from the principle or sacrificing any of the advantages of the invention as defined by the appended claim.

Having thus described my invention, what I claim as new, and desire to secure by Letters Patent, is—

The herein-described disk jointer for plows, comprising the conical, inclined bearing having the vertical arm 7 on its upper side, said arm having the recess 6 in its outer side forming a seat, the hanger 4 having its lower end in said seat, the conical journal in the bearing and having the dished enlargement at its inner end, the disk having its central portion bearing against said dished enlargement, the bolt passed through the disk and journal and having the nut and washer, the latter bearing against the bearing, the scraper for the disk, and the bracket-arm for said scraper having a screw-threaded outer end passed through the arm 7 and hanger 4 and provided with the nuts to clamp them together and also securing the scraper, substantially as described.

In testimony whereof I have hereunto set my hand in presence of two subscribing witnesses.

THOMAS MACK ROSS.

Witnesses:
 ALLEN McREYNOLDS,
 FRANK F. ROSS.